US007922852B2

(12) United States Patent
Hansch

(10) Patent No.: US 7,922,852 B2
(45) Date of Patent: Apr. 12, 2011

(54) APPARATUS AND METHOD FOR AFFIXING A SUPPLEMENTARY PRODUCT TO A PRINTED PRODUCT

(75) Inventor: Egon Hansch, Wetzikon (CH)

(73) Assignee: Ferag AG, Hinwil (CH)

( * ) Notice: Subject to any disclaimer, the term of this patent is extended or adjusted under 35 U.S.C. 154(b) by 223 days.

(21) Appl. No.: 12/256,633

(22) Filed: Oct. 23, 2008

(65) Prior Publication Data

US 2009/0044899 A1 Feb. 19, 2009

Related U.S. Application Data

(62) Division of application No. 10/929,657, filed on Aug. 30, 2004, now Pat. No. 7,451,796.

(30) Foreign Application Priority Data

Sep. 18, 2003 (CH) ...................................... 1602/03

(51) Int. Cl.
*B32B 37/02* (2006.01)

(52) U.S. Cl. ....................................... 156/216; 156/227

(58) Field of Classification Search .................. 156/216, 156/227, 475

See application file for complete search history.

(56) References Cited

U.S. PATENT DOCUMENTS

| | | | | |
|---|---|---|---|---|
| 2,064,658 | A | 12/1936 | Grieb et al. | |
| 4,160,687 | A | 7/1979 | Spear | |
| 4,181,561 | A * | 1/1980 | Seragnoli | 156/566 |
| 5,615,537 | A | 4/1997 | Vollenweider | |
| 5,632,476 | A | 5/1997 | Stauber | |
| 5,980,676 | A | 11/1999 | Meetze | |
| 6,533,016 | B2 | 3/2003 | Hansch | |
| 6,698,742 | B2 | 3/2004 | Hansch | |
| 2003/0075853 | A1 | 4/2003 | Hansch | |

* cited by examiner

*Primary Examiner* — Khanh Nguyen
*Assistant Examiner* — John Blades
(74) *Attorney, Agent, or Firm* — Brinks Hofer Gilson & Lione

(57) ABSTRACT

The invention relates to an apparatus and a method for affixing a supplementary product (22) to a printed product (36). According to the invention, in order to pick up the supplementary product (22), holding elements (12) driven along a circulation path (26) have at least one suction element (24, 25). In order to bend the initially flat supplementary product (22) in such a way that it can be placed around an edge (36*c*) of the printed product (36), there is at least one bending element (18). This is capable of acting on the supplementary product (22) held on one side by the suction element (24, 25) in such a way that the said supplementary product (22) is bent at least approximately in a V shape. Holding element (12) and bending element (18) interact with a supporting element (44) in such a way that the supplementary product (22), reaching over an edge (36*c*) of the printed product (36), is pressed onto two opposite sides (36*a*, 36*b*) of the printed product (36).

4 Claims, 5 Drawing Sheets

APPARATUS AND METHOD FOR AFFIXING A SUPPLEMENTARY PRODUCT TO A PRINTED PRODUCT

RELATED APPLICATIONS

This application is a divisional of application Ser. No. 10/929,657, filed Aug. 30, 2004, now U.S. Pat. No. 7,451,796 the entire contents of which are hereby incorporated by reference herein.

This application claims priority from Swiss Patent Application No. 2003 1602/03, filed Sep. 18, 2003.

FIELD OF THE INVENTION

The invention relates to an apparatus and a method for affixing a supplementary product, in particular a section of adhesive tape, to a printed product.

BACKGROUND OF THE INVENTION

A generic apparatus for affixing flat, self-adhesive supplementary products, in particular labels, samples of goods, MemoStick® or Post-It® products, is disclosed by EP-A 1 112 861 or EP-A 1 275 607. The apparatus according to EP-A 1 112 861 comprises a number of holding elements comprising an L-shaped base body and a top part fixed thereto such that it can rotate. The top part has a suction element, with which supplementary products can be gripped individually at a pick-up point. In the region of a discharge point, the supplementary products are pressed onto printed products conveyed past there. Previously, they have been located into a position running parallel to the printed product. The printed product is supported by an adjacent holding element during the pressing-on action. For this purpose, the holding elements are configured such that they can move relative to one another. The apparatus according to EP-A 1 275 607 additionally offers the possibility of affixing the supplementary product optionally to the leading or trailing side of the printed product in the conveying direction by means of suction elements present on both sides of the top part. Neither of the apparatuses is capable of placing a supplementary product around one edge of the printed product, for example in order to reinforce or to seal this edge.

EP-A 0 666 186 discloses closing a folded, multi-part printed product at its open edges with a supplementary product in the form of a section of adhesive tape, in order to prevent inserted product parts falling out or being displaced. The elongated sections of adhesive tape are picked up in an initially flat form by transfer tongs arranged on a wheel, are then bent by closing the tongs and are pressed onto mutually opposite sides of the printed product. The transfer tongs in each case have at the ends of their jaws a suction element which in each case keeps one end of the section of adhesive tape active. The opened transfer tongs take up a relatively large amount of space, which determines the minimum spatial distance between two pairs of tongs and thus also the processing cycle. Furthermore, the spacing of the suction elements and thus the optimum size of the section of adhesive tape cannot be varied.

SUMMARY OF THE INVENTION

The invention is based on the object of further developing an apparatus and a method of the type mentioned at the beginning in such a way that supplementary products can be fixed to two sides of the printed product without great extra expenditure on construction, the said products reaching over at least one edge of the printed product.

The apparatus according to the invention has a number of holding elements arranged one after another along a closed circulation path and driven in a circulation direction, and at least one supporting element. The holding elements have at least one suction element, with which they are capable of picking up a supplementary product, in particular in the form of a flat section of adhesive tape, at a pick-up point. In order to bend the initially flat supplementary product in such a way that it can be placed around an edge of a printed product, there is at least one bending element. The latter is capable, at least in the region of the discharge point, of acting on the supplementary product in such a way that the supplementary product held on one side by the suction element is bent at least approximately in a V shape. In this case, the bending element does not grip the supplementary product actively, that is to say the supplementary product is not attracted by suction or clamped in or fixed in any other way by the bending element. The bending element is instead used as a rest or support in order to bend the supplementary product, for example by means of a relative movement of suction element and bending element. Holding element, supporting element and bending element interact in such a way that the supplementary product, reaching over an edge of the printed product, is pressed onto two opposite sides of the printed product.

The invention has the advantage that supplementary products of intrinsically any desired flat form can be gripped reliably by the suction element and bent in a V shape by the bending element. In this case, the bending element is not necessarily matched to a specific shape of the supplementary product and can be configured very simply mechanically, for example in the form of a springy tongue.

The apparatus can have a supporting element arranged to be stationary in the region of the discharge point or moved together with the holding elements there. However, there is preferably a plurality of supporting elements which are moved together with the holding elements. Particularly preferably, each holding element is assigned a supporting element. As described in EP-A 1 112 861 or EP-A 1 275 607, the supporting elements can advantageously be implemented by the holding elements leading and/or trailing in the direction of movement.

Although, intrinsically, a bending element arranged in the region of the discharge point or moved there together with the holding elements is sufficient, there is preferably a plurality of bending elements, which are moved together with the holding elements. These can be, for example, a constituent part of the holding element. Particularly preferably, each holding element is assigned a bending element.

BRIEF DESCRIPTION OF THE DRAWINGS

The invention will be explained in more detail using exemplary embodiments illustrated in the drawings, in which, purely schematically.

DESCRIPTION OF THE PREFERRED EMBODIMENTS

Figure 1:
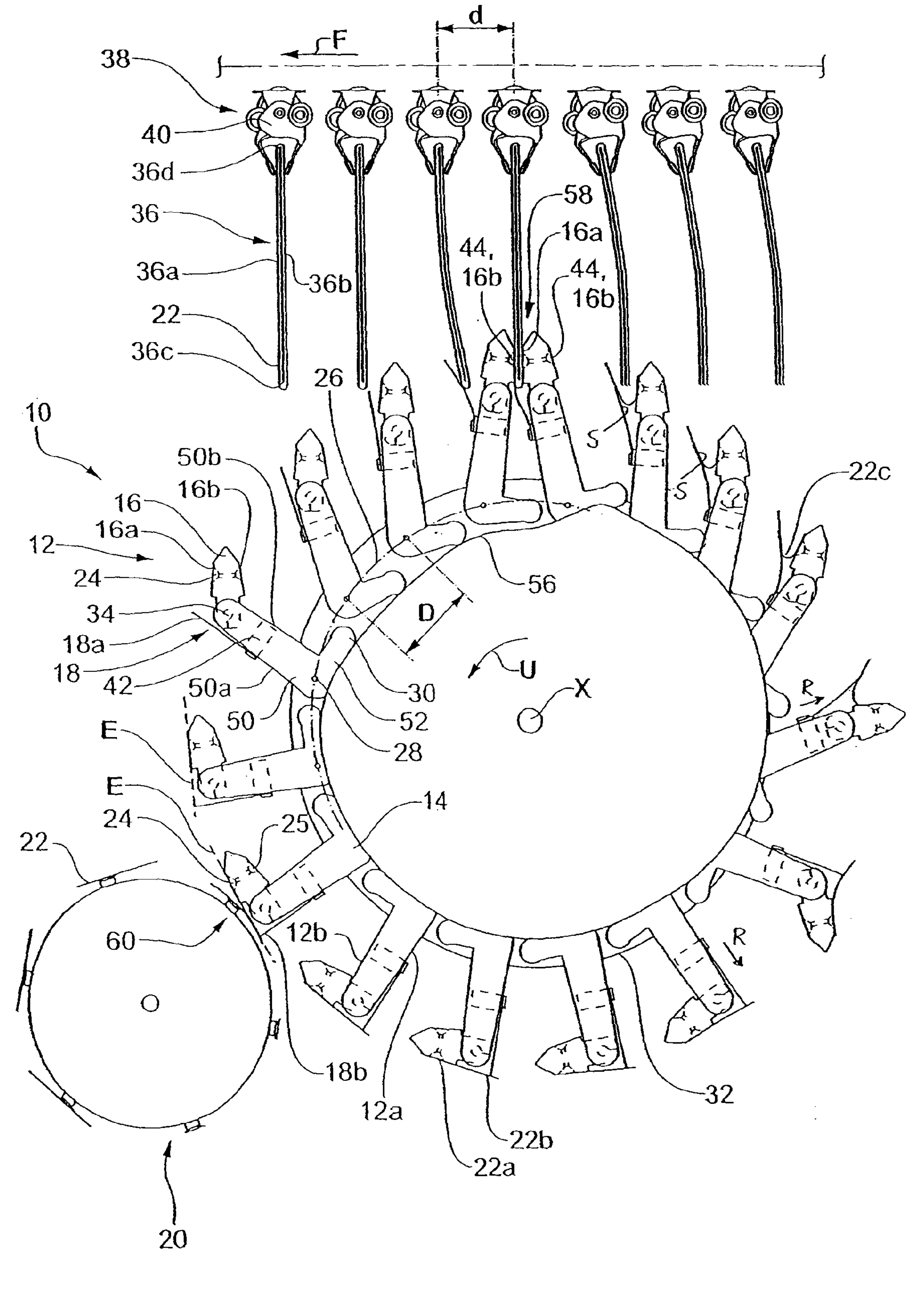
FIG. 1 shows an apparatus according to the invention having bending elements arranged on the leading side of the holding elements.
Figure 2:
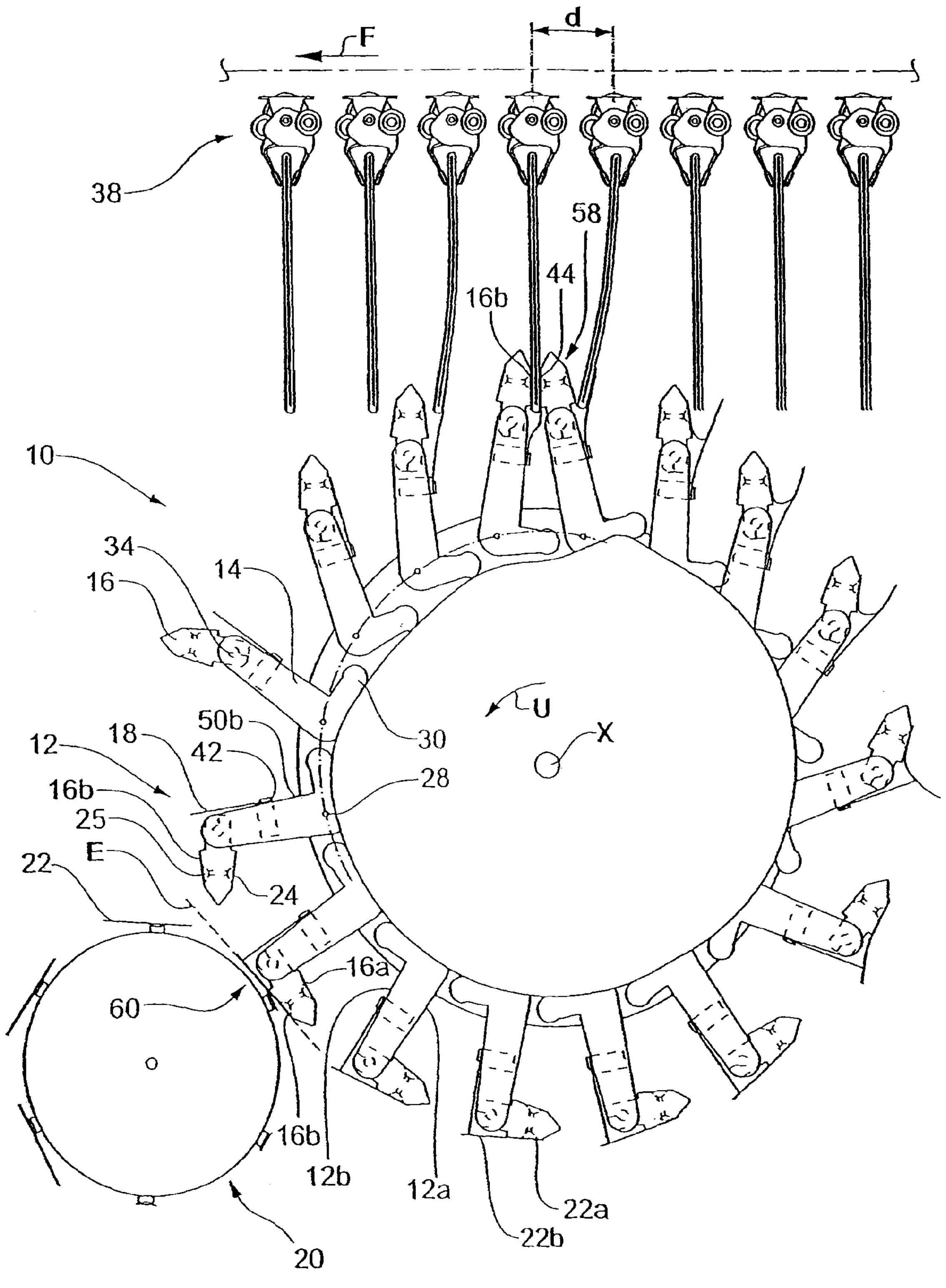
FIG. 2 shows an apparatus according to the invention having bending elements arranged on the trailing side of the holding elements.
Figure 3:
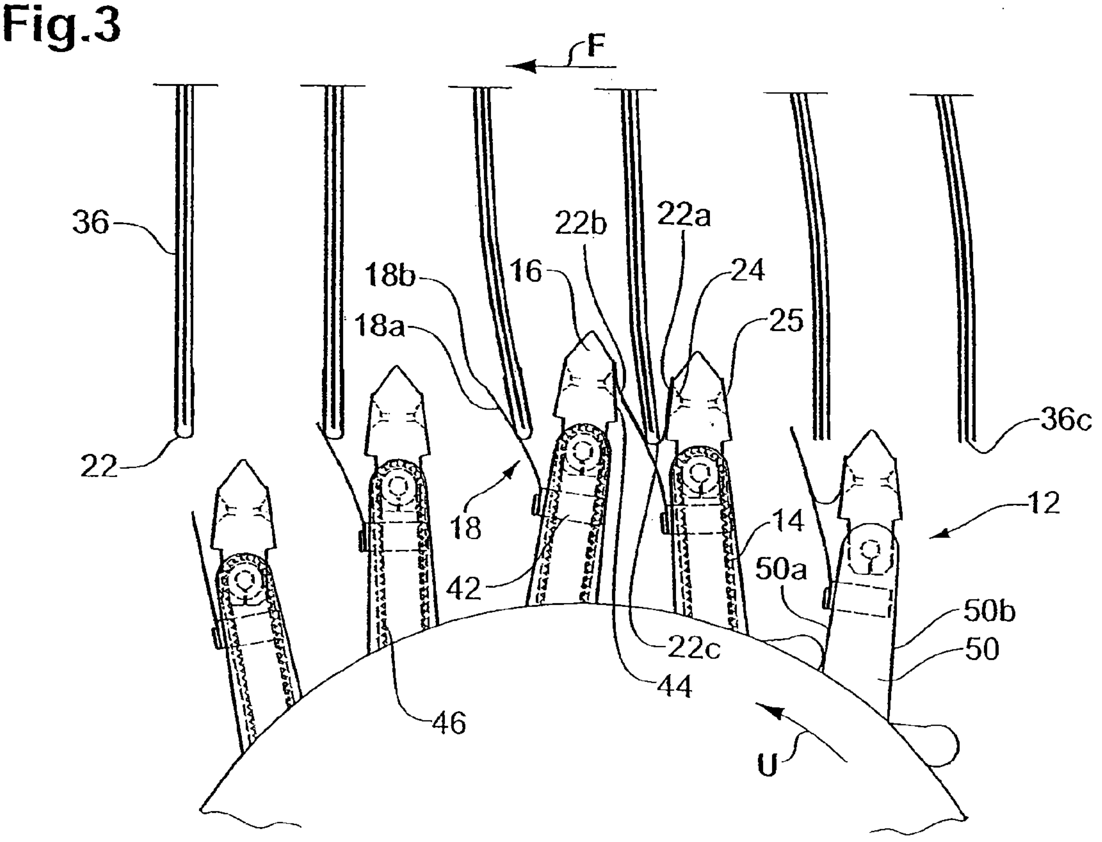
FIG. 3 shows a detail view of the discharge region of the apparatus according to FIG. 1.
Figure 4:
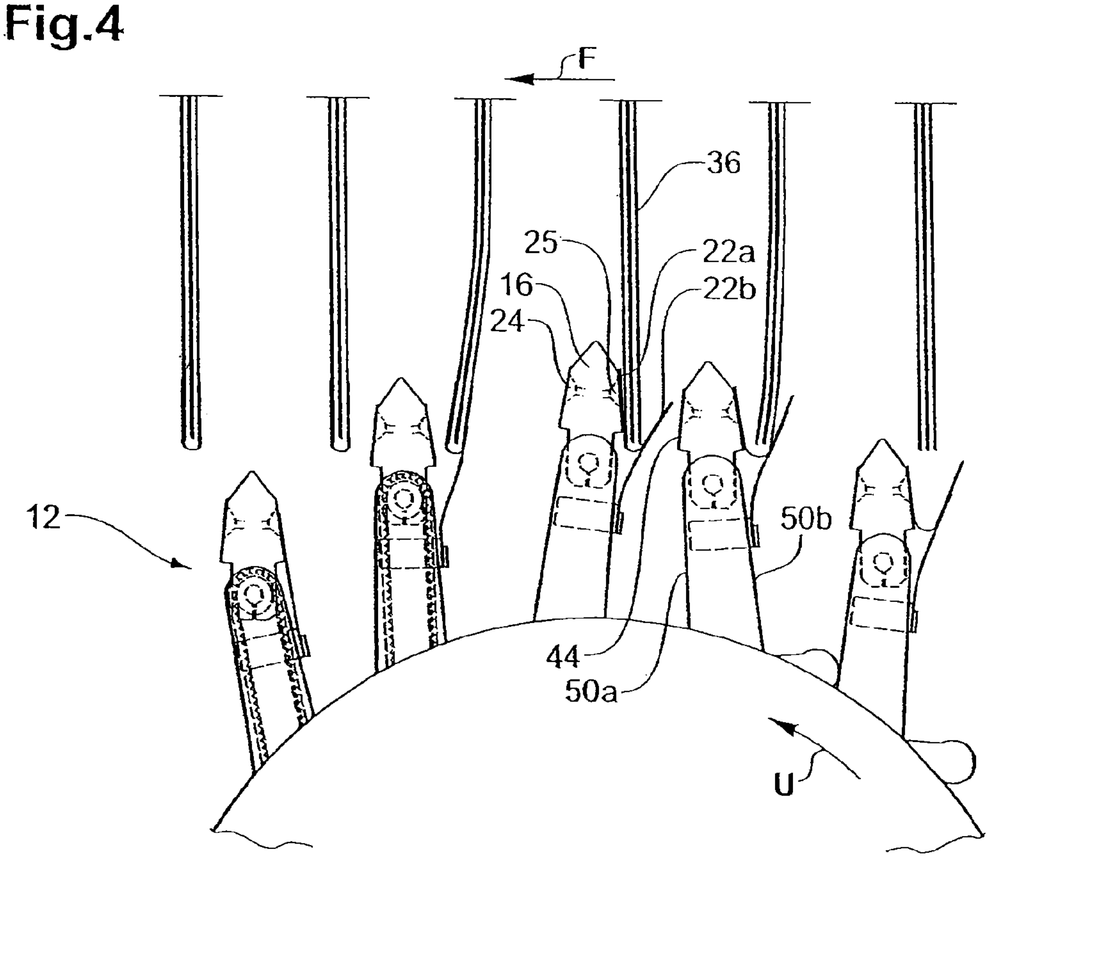
FIG. 4 shows a detail view of the discharge region of the apparatus according to FIG. 2.

FIGS. 1 and 2 in each case show an apparatus 10 according to the invention having a plurality of holding elements 12 arranged one after another with integrated bending elements 18. These are moved in a circulation direction U along a closed circulation path and, in the process, pass a pick-up point 60 and a discharge point 58. FIGS. 3 and 4 show detail views of the region of the discharge point 58, but in different instantaneous recordings. In FIGS. 1 and 3, the bending elements 18 are on the leading side 12*a* of the holding elements 12, in FIGS. 2 and 4 on the trailing side 12*b* of the holding elements 12.

With the exception of the bending element 18, the construction and the function of the holding element 12 corresponds to the holding elements illustrated and explained in EP-A 1 275 607. Furthermore, the construction and the function of the apparatus 10 corresponds to the apparatus illustrated and explained in EP-A 1 275 607. In the following text, therefore, the construction and functioning of the invention will be explained only to the extent necessary for the understanding of the invention. Otherwise, reference is made to the contents of EP-A 1 275 607. In addition, the possible modifications of the apparatus described in EP-A 1 275 607 can be used in the present case.

At the pick-up point 60, supplementary products 22 are picked up from a feed device 20. At the discharge point 58, these are discharged to printed products 36 and pressed onto the latter. The printed products 36 are conveyed in a conveying direction F, suspended at a substantially constant spacing d, by a conveying device 38, here in the form of a gripper conveyor having grippers 40. The holding elements 12 comprise a base body 14, on which the top part 16 is arranged such that it can be pivoted and the bending element 18 is arranged such that it can be displaced linearly. In the region of the discharge point 58, the top parts 16 of two adjacent holding elements 12 project between the printed products 36. By means of a movement towards each other, a supplementary product 22 previously bent by means of the bending element 18 is placed around the edge 36*c* to be sealed, here the open lower edge (what is known as the bloom), of the printed product 36 and pressed firmly there. The holding element 12 leading in the circulating direction or its top part 16 acts as a supporting element 44 in the process.

The base body 14 of the holding element 12 has the shape of a substantially L-shaped angled lever which is attached to a carrier disc 32. The attachment axes 28 lie on a circular circulation path 26, whose centre is the axis of rotation X of the carrier disc 32, and are approximately at the same distance D from one another. The top part 16 is connected to the first leg 50 of the base body 14 such that it can pivot about a pivot axis 34. The pivot axis 34 runs at right angles to the circulation direction U and parallel to the axis of rotation X. The second leg 52 is provided with a control roller 30 which rolls on a slotted control guide 56. By means of the slotted control guide 56, the angle assumed by the first leg 50 relative to the radial direction can be varied. As a result of the curved circulation path 26, in each case a holding element 12 sticks in between two adjacent printed products 36. In the process, the bending element 18 is located on one side 36*a* and the top part 16 is located on the respective other side 36*b* of the printed product 36.

The top part 16 has an approximately trapezoidal cross section and is equipped with at least one suction element 24, which is arranged in the first surface 16*a* of the top part 16. A second surface 16*b* located opposite the said first surface 16*a* has the function of the supporting element 44, as will be explained in more detail further below. In the variant according to FIGS. 2 and 4, the rollers of the first and second surfaces are interchanged. A further suction element 25 can be arranged in the second surface 16*b*. It is used in particular when the top parts 16 are inclined in the circulation direction U as they pick up the supplementary products 22 (cf. FIG. 2). Furthermore, the supplementary products 22 can also be pressed onto the leading side 36*a* of the printed product 36 in the flat state instead of on the trailing side 36*b* by using the further suction element 25, if the bending element 18 is deactivated (cf. EP-A 1 275 607).

Figure 6:
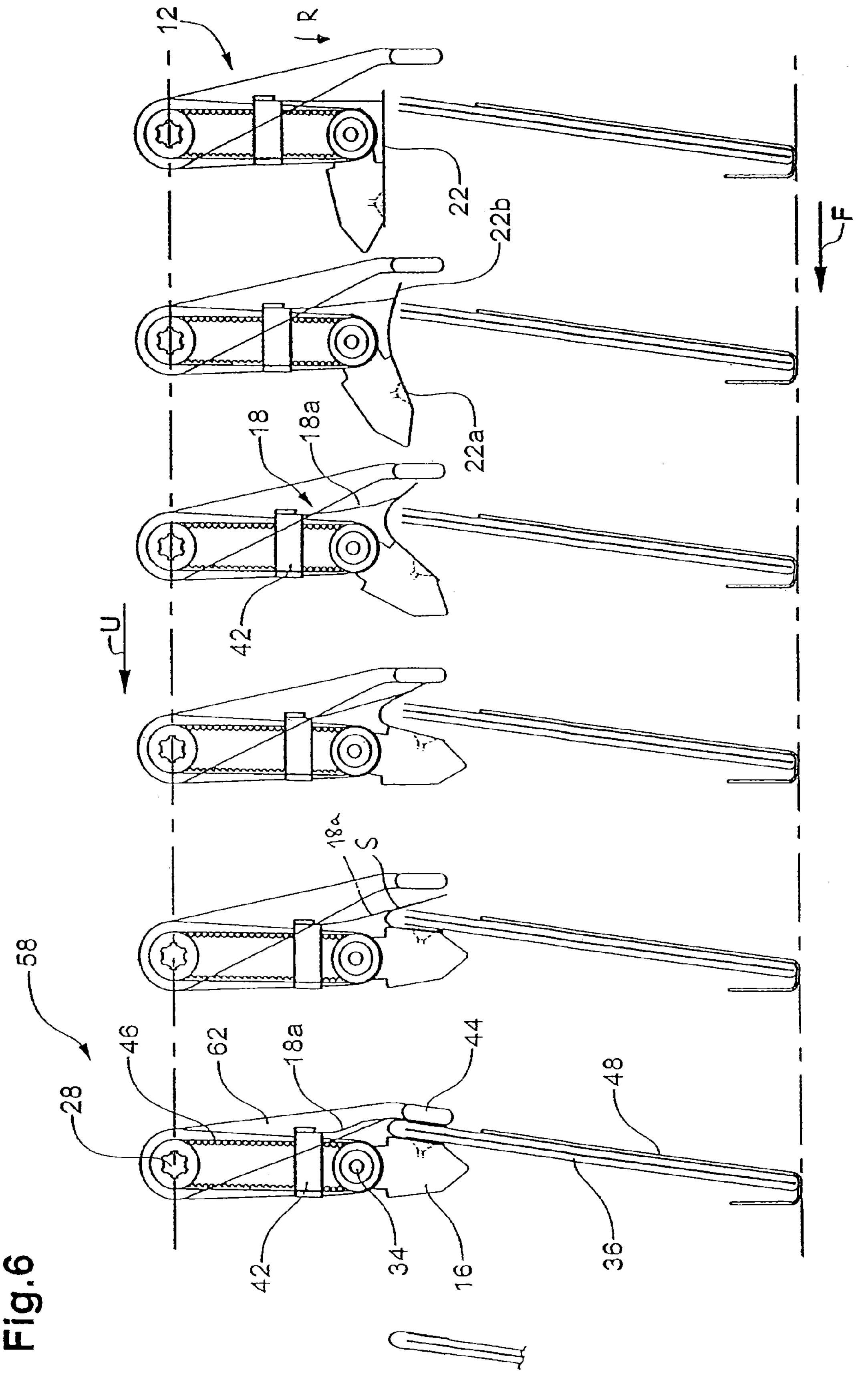
FIG. 6 shows a further apparatus according to the invention having supporting elements arranged on the holding elements.

The bending element 18 comprises a leaf-like tongue 18*a*, which is fitted to the first leg 50 by means of a fixing element 42 such that it can be displaced in its longitudinal direction. In the exemplary embodiment according to FIGS. 1 and 3, the tongue 18*a* is oriented substantially parallel to the leading edge 50*a* of the leg 50. As shown in FIGS. 2 and 4, the tongue 18*a* can also be arranged on the trailing edge 50*b* of the first leg 50. In this case, a suction element 25 on the second surface 16*b* of the top part 16 comes into use, the suction element 24 on the first surface 16*a* being dispensable. As illustrated in FIGS. 3 and 6, the fixing element 42 is preferably connected to a drive element 46, a toothed belt here, and is displaced by the latter along the base body 14. The drive element 46 is also used to transmit a drive force to the rotatable top part 16. In the present case, the bending element 18 and the top part 16 are therefore displaced and rotated synchronously. It is also possible to drive the bending element 18 and top part 16 separately; the movements should then be coordinated with one another.

The top part 16, which can be rotated relative to the base body 14, has the purpose of bringing the supplementary product 22 picked up at the pick-up point 60 in the flat state as far as the discharge point 58 into a position in which the first end 22*a* of the supplementary product 22 held by the suction element 24 runs approximately parallel to the printed product 36. In the present case, the supplementary products 22 are fed tangentially to the movement path 26 by the feed apparatus 20. The feed apparatus 20 and the top parts 16 roll on one another, by which means a rapid and reliable transfer of the supplementary products in the flat state is achieved. Previously, the supplementary products have, for example, been cut off from a supply roll, not illustrated here, and/or detached from a carrier material. Furthermore, a supply from a stack or fan-fold is possible. The feed apparatus 20 preferably rotates the separated sections into a position suitable for the further processing. In this position, the sections of the supplementary product, which are provided with an adhesive, are preferably located one after another in the circulation direction U. It is possible for one or more adhesive regions to be provided. The supplementary product is composed, for example, of paper or plastic, for example a transparent plastic film. In the region of its vertex 22*c*, it can have a perforation, which makes subsequent division easier.

At the pick-up point 60, the top part 16 is in a position in which it is bent over by approximately 90° counter to (FIG. 1) or in the direction of movement U (FIG. 2) of the base body 14. A pick-up plane E defined by its first surface 16*a* (FIG. 2: second surface 16*b*) and the corresponding suction element 24, 25 runs tangentially with respect to the movement path 26. Furthermore, the bending element 18 is in a rest position located radially on the inside, in which its leading edge 18*b*, seen from the axis of rotation X or from the attachment axis 28, lies in or before the pick-up plane E. Holding element 12 and suction element 24 can thus easily be brought close to the feed apparatus 20 in order to pick up the supplementary product 22 in the flat state. While the top part 16 is located on the path to the discharge point in or counter to the circulation direction U, the bending element 18 is pushed radially outwards in a direction R. Its leading edge 18*b* at the discharge point 58 is finally located on the other side of the pick-up plane E. The first surface 16*a* of the top part 16 is rotated from a direction running substantially tangentially with respect to the movement path 26 into a direction running substantially at right angles thereto. Under the influence of the movement of the bending element 18 and the top part 16, the supplementary product 22 is bent in a V shape. Initially, the bending element 18 supports the free end 22*b* of the supplementary product 22 only by means of its leading edge 18*b* and then, during its further radial movement, slides along this end 22*b*. In the process, the free end 22*b* comes into flat contact with the bending element 18. As a result of the inherent stiffness of the supplementary product and the flexibility of the tongue 18*a*, the tongue 18*a* is easily forced away from the first leg 50. The bending element 18 or its inner surface acting as a supporting surface S and resting on the supplementary product 22, forms an acute angle with the plane E. Thus, a V-shaped holder of the supplementary product 22 is formed between the top part 16 and the bending element 18.

In addition to simple production, the design illustrated has the advantage that the extent of the holding element 12 in the circumferential direction U is not enlarged substantially by the bending element 18. In addition, in the case of wider supplementary products 22, the bending element 18 is accommodated in a space-saving manner on one side of the holding element and does not project laterally, or not substantially, when in the rest position.

As can be seen in the detail drawing of the discharge region (FIG. 3 or 4), the holding elements 12 are led up from below to the printed products 36 conveyed in a suspended manner. The distances and conveying speeds are in this case chosen such that the lower edge 36*c* at the discharge point 58 is positioned in the region of the vertex 22*c* of the supplementary product 22. At the discharge point 58, the slotted control guide 56 is shaped in such a way that the first legs 50 and the top parts 16 of two adjacent holding elements 12 are inclined towards one another. Here, in the case of FIGS. 1 and 3, the first surface 16*a* of the trailing holding element 12, still carrying a supplementary product 22, is oriented parallel to and largely congruent with the second surface 16*b* of the leading holding element 12, acting as a supporting element 44. As a result of the relative movement of the adjacent holding elements 12, the bending element 18, which is located between them, is bent so that it is likewise oriented parallel to the surfaces 16*a*, 16*b*. The supplementary product 22 is thus pressed with its end 22*a* originally held by the suction head 24 onto the trailing side 36*b* of the printed product 36, and with its free end 22 supported on the bending element 18 and indirectly by the supporting element 44 onto the leading side 36*a* of the printed product, and fixed there. In the case of FIGS. 2 and 4, the converse situation results, that is to say the trailing holding element 12 acts as a supporting element 44.

The supplementary product 22 can extend over the entire length of the edge 36*c* or only a part thereof. It is used in particular to seal the edge 36*c* which is open here (what is known as the bloom of the printed product). The printed products 36 can, however, also be gripped in such a way that the folded edge 36*d* or a side edge is provided with a supplementary product 22, for example in order to reinforce the folded edge 36*d*, to affix a hanger, to hide the stapling, to close the open edges to prevent inserts falling out or as a reading protection as an alternative to foil-laminating the entire printing product. In the present case, the supplementary product 22 rests fully on the printed product 36, but the vertex 22*c* can also be spaced apart from the edge 36*c*.

The bending element 18 preferably has an elasticity or flexibility matched to the stiffness of the supplementary product 22. Its mechanical properties are preferably chosen such that, as illustrated, it is spread apart by the supplementary product 22 from the leg 50 from a position originally running parallel to the first leg 50 but, during the pressing-on operation, can be deformed easily and without great expenditure of force. For the processing of paper or plastic supplementary products, the bending element 18 or the tongue 18*a* is preferably made of hardened spring steel and, for example, has an effective length, measured from the fixing element 42, of 80 mm, a width of 20 mm and a thickness of 0.1 mm. If the spring element 18*a* consists of another material, for example plastic, leather, wood, metal, a similar elasticity is preferably chosen.

In principle, a bending element which is also only slightly springy or even not springy at all is also suitable if it can preferably move relative to the holding element 12, for example can be pivoted. Its design and mechanical properties should be chosen such that its surface is already oriented parallel to the printed product as it is pressed on in the discharge position, or is aligned parallel to the printed product by the pressing-on operation.

The apparatuses shown in FIGS. 1-4 are developed from the apparatus shown in EP-A 1 275 607 by means of simple additional fitting of the bending elements 18 according to the invention. The bending elements 18 are simple in design terms, economical and easy to mount. The bending elements 18 can be mounted in the same basic apparatus according to EP-A 1 275 607 in or counter to the circulation direction, which results in different functions. The drive used is the drive of the top part 16, which is present in any case.

Figure 5:
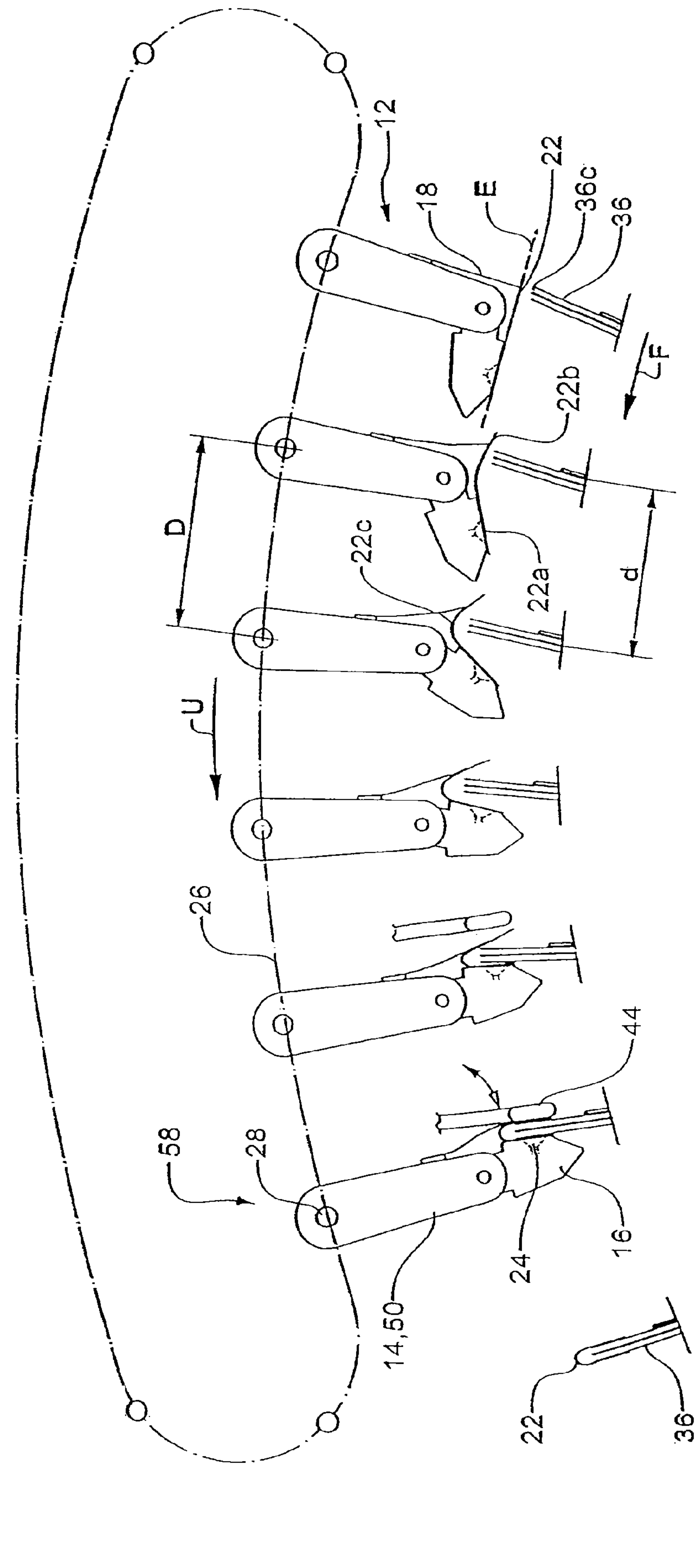
FIG. 5 shows a further apparatus according to the invention.

FIG. 5 shows a further variant of an apparatus according to the invention, only the region of the discharge point 58 being illustrated. The holding elements 12 in this region are conveyed in a suspended manner along a slightly concavely curved circulation path 26. Their spacing D is matched to the spacing d of the printed products 36 conveyed linearly in an upright manner in pockets 48 (cf. FIG. 6) or on saddles (not illustrated) in the substantially identical conveying direction F. The construction of the holding elements 12 substantially corresponds to that from FIGS. 1-4. As distinct from FIGS. 1-4, adjacent holding elements 12 do not function mutually as a supporting element at the discharge point 58. Therefore, the second leg 52 and the corresponding slotted control guide for the relative movement of two adjacent holding elements 12 are not necessarily present. Instead, in the present case, there is a supporting element 44 at the discharge point 58 which interacts with the top part 16 in order to press a supplementary product 22 on. The supporting element 44 is moved together with the holding elements 24 over part of the movement path 26. There can be a plurality of supporting element 44. Furthermore, as shown in FIG. 6, the supporting element 44 can be a constituent part of the holding element 12.

As can be seen in the right-hand part of the figure, the top part 16 is initially oriented approximately at right angles to the base body 14. The bending element 18 is in its rearward position. The supplementary product 22 held is thus aligned approximately parallel to the direction of movement U of the holding elements 12 and to the conveying direction F of the printed products 36 and is at a short distance from the edge 36*c* of the printed products to be sealed. By means of the simultaneous pivoting movement of the top part 16 about the pivot axis 34 and of the bending element 18 at right angles thereto in the direction R, top part 16 and bending element 18 stick in between adjacent printing products 36, in each case on one side 36*a*, 36*b* of a printed product 36. A curved circulation path 26 as in FIGS. 1-4 is therefore not necessary in order to bring the supplementary product 22 sufficiently close to the printed product 36. The supplementary product 22 is thus bent around the edge 36*c* and pressed on there at the discharge point 58. The bending is assisted by the force of gravity.

FIG. 6 shows a variant of the apparatus from FIG. 5, in which each holding element is assigned a supporting element 44. Here, too, it is thus possible to dispense with a relative movement of the holding elements 12 and a corresponding slotted control guide. The supporting element 44 is connected to the holding element 12 via a lever 62. It can be pivoted about the attachment axis 28, but can also be pivotable about an axis running parallel thereto. The supporting element 44 is preferably driven jointly with the top part 16 and the bending element 18.

In the grippers 40, pockets 46 or saddles of the conveying devices 38 for the printed products 36, instead of one printed product 36, it is also possible for a plurality to be held in each case and connected by a common supplementary product 22.

The supplementary product 22 is not necessarily flat. It can also be a three-dimensional object which is bent by the bending element 18 in order to be affixed to the printed product 36.

The invention claimed is:

1. Method of affixing a supplementary product, in particular a section of adhesive tape, to a printed product, comprising the following steps:

conveying printed products with a spacing (d) from one another to a discharge point;

moving holding elements, which have at least one suction element, along a closed circulation path in a circulation direction (U) from a pick-up point to the discharge point;

picking up a supplementary product at the pick-up point by suction by means of the suction element;

pressing the supplementary product onto the printed product at the discharge point as a result of interaction between the holding element and a supporting element;

characterized by the following steps:

picking up the supplementary product in a substantially flat state;

bending the supplementary product to an at least approximately V shape before or when reaching the discharge point by displacing a bending element, without the bending element seizing the supplementary product actively, said bending element being moved along the circulation path together with the holding element;

and pressing the supplementary product onto two opposite sides of the printed product in such a way that it reaches over one edge of the printed product.

2. Method according to claim 1, characterized in that the bending element is displaced in a direction running substantially at right angles to the circulation path in order to bend the supplementary product.

3. Method according to claim 1, characterized in that the holding element has a base body and a top part, the suction element being arranged in the top part, and a bending element being connected to each holding element, pivoting the top part, during its movement from the pick-up point to the discharge point, relative to the base body about a pivot axis running at right angles to the circulation path, and the bending element being displaced relative to the base body in a direction (R) substantially at right angles to the pivot axis and to the circulation path, the movements of the top part and of the bending element being synchronized in such a way that a supplementary product held by the suction element and supported on the bending element is bent in a V shape when reaching the discharge point.

4. Method according to claim 3, characterized in that the top part and the bending element are moved relative to the basic body in such a way that, in the region of the discharge point, a holding plane (E) defined by the suction element runs parallel to the printed product, and a supporting surface (S) for the supplementary product, defined by the bending element, runs at a preferably acute angle thereto.

* * * * *